US010230796B2

(12) United States Patent
Chinn et al.

(10) Patent No.: US 10,230,796 B2
(45) Date of Patent: Mar. 12, 2019

(54) INTELLIGENT DISK SPACE MANAGER

(71) Applicant: Apple Inc., Cupertino, CA (US)

(72) Inventors: Paul William Chinn, San Jose, CA (US); Timothy P. Hannon, Mountain View, CA (US); Cameron S. Birse, San Jose, CA (US); Ronnie G. Misra, San Jose, CA (US)

(73) Assignee: Apple Inc., Cupertino, CA (US)

( * ) Notice: Subject to any disclaimer, the term of this patent is extended or adjusted under 35 U.S.C. 154(b) by 677 days.

(21) Appl. No.: 14/500,926

(22) Filed: Sep. 29, 2014

(65) Prior Publication Data

US 2015/0350323 A1  Dec. 3, 2015

Related U.S. Application Data

(60) Provisional application No. 62/005,630, filed on May 30, 2014.

(51) Int. Cl.
*H04L 29/08* (2006.01)

(52) U.S. Cl.
CPC .............................. *H04L 67/1097* (2013.01)

(58) Field of Classification Search
CPC ............... G06F 11/1435; G06F 3/122; G06F 17/30067; G06F 2209/522; G06F 17/30587; G06F 9/50; G06F 17/30088; G06F 2009/45583; G06F 2201/805; G06F 3/0652; G06F 2221/0784; G06F 17/30132; G06F 17/30144; G06F 3/0608; G06F 9/30043; H04L 67/1021; H04L 69/329; H04L 67/1008; H04L 67/109; H04L 67/2842; G06Q 20/32; H04N 21/2747; H04N 21/4335; H04W 88/02
See application file for complete search history.

(56) References Cited

U.S. PATENT DOCUMENTS

| 5,463,776 | A | * | 10/1995 | Voigt | G06F 3/0601 |
| 5,893,920 | A | * | 4/1999 | Shaheen | G06F 12/0813 |
| | | | | | 707/E17.01 |
| 7,124,272 | B1 | * | 10/2006 | Kennedy | G06F 3/0613 |
| | | | | | 711/173 |
| 8,788,778 | B1 | * | 7/2014 | Boyle | G06F 12/0253 |
| | | | | | 711/155 |
| 9,052,942 | B1 | * | 6/2015 | Barber | G06F 9/4843 |
| 9,417,917 | B1 | * | 8/2016 | Barber | G06F 9/5005 |
| 2005/0010932 | A1 | * | 1/2005 | Kohno | G06F 8/656 |
| | | | | | 719/328 |
| 2005/0273476 | A1 | * | 12/2005 | Wertheimer | G06F 11/1458 |
| 2007/0204125 | A1 | * | 8/2007 | Hardy | G06F 8/62 |
| | | | | | 711/170 |
| 2008/0046557 | A1 | * | 2/2008 | Cheng | H04M 1/72525 |
| | | | | | 709/224 |
| 2009/0164201 | A1 | * | 6/2009 | Celli | H04L 41/20 |
| | | | | | 703/21 |

(Continued)

*Primary Examiner* — SM A Rahman
*Assistant Examiner* — Ranjan Pant
(74) *Attorney, Agent, or Firm* — Dickinson Wright RLLP (57) ABSTRACT

Disclosed herein is a technique for managing disk space in user devices. A disk space manager is configured to manage the disk space by requesting clients running on the user device to free up disk space. The clients receive the requests and respond to the requests by deleting their own data to free up the requested disk space.

20 Claims, 7 Drawing Sheets

(56) References Cited

U.S. PATENT DOCUMENTS

| | | | | |
|---|---|---|---|---|
| 2012/0221611 | A1* | 8/2012 | Watanabe | G06F 3/0608 |
| | | | | 707/827 |
| 2013/0185341 | A1* | 7/2013 | Rajaram | G06F 3/0608 |
| | | | | 707/821 |
| 2014/0067879 | A1* | 3/2014 | Ahn | G06F 17/30312 |
| | | | | 707/812 |
| 2014/0068219 | A1* | 3/2014 | McNutt | G06F 11/1076 |
| | | | | 711/170 |
| 2014/0223099 | A1* | 8/2014 | Kidron | G06F 12/0806 |
| | | | | 711/118 |
| 2015/0134913 | A1* | 5/2015 | Huang | G06F 12/0833 |
| | | | | 711/135 |

* cited by examiner

INTELLIGENT DISK SPACE MANAGER

CROSS-REFERENCE TO RELATED APPLICATIONS

The present application claims the benefit of U.S. Provisional Application No. 62/005,630, entitled "INTELLIGENT DISK SPACE MANAGER" filed May 30, 2014, the content of which is incorporated herein by reference in its entirety for all purposes.

FIELD

The described embodiments set forth a technique for managing disk space in user devices.

BACKGROUND

Generally, users tend to load their devices with large amounts of data (e.g., music, pictures, movie, etc.). At some point, there may not be enough disk space remaining in a user device to allow additional data to be loaded. In other words, the user device may run out of disk space which leads to performance degradation.

Typically, when the user device runs out of disk space, the user is asked to free up some disk space. For instance, the user is presented with a dialog box indicating that the user device is out of disk space. A list of applications installed on the device is displayed and the user is asked to delete some of these applications (and associated data). Thus, the user is forced to make an uninformed decision regarding which applications to keep or delete in order to free up disk space which is not a particularly good user experience.

In another scenario, when the user device runs out of disk space, all data associated with an application could be deleted without consideration of the impact such an action would have on the user. For example, when the user's entire music library is deleted, the user would have a bad experience of having to download the songs again when he wants to listen to them. Consequently, there is a need for a system that is capable of intelligently freeing up disk space while preserving the best user experience possible.

SUMMARY

Representative embodiments set forth herein disclose various techniques for managing disk space in a user device. In particular, the embodiments set forth various techniques for allowing a disk space manager to manage the disk space by requesting clients running on the user device to free up disk space by, for example, deleting some of their own data. The disk space manager can be triggered to send requests to the clients based on a determination that the user device is out of disk space or a determination that a process (for example, a software update) requiring a particular amount of disk space is going to be run on the user device.

The clients receive the requests from the disk space manager and determine whether they can free up disk space. The clients then determine what amount of disk space they can free up. After freeing up a particular amount of disk space, the clients respond back to disk space manager. The responses indicate the amount of disk space they freed up. The disk space manager can then determine whether to continue sending additional requests to free up disk space based on whether a required target amount of disk space was freed up by the clients.

This Summary is provided merely for purposes of summarizing some example embodiments so as to provide a basic understanding of some aspects of the subject matter described herein. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

Other aspects and advantages of the embodiments described herein will become apparent from the following detailed description taken in conjunction with the accompanying drawings which illustrate, by way of example, the principles of the described embodiments.

BRIEF DESCRIPTION OF THE DRAWINGS

The included drawings are for illustrative purposes and serve only to provide examples of possible structures and arrangements for the disclosed inventive apparatuses and methods for providing wireless computing devices. These drawings in no way limit any changes in form and detail that may be made to the embodiments by one skilled in the art without departing from the spirit and scope of the embodiments. The embodiments will be readily understood by the following detailed description in conjunction with the accompanying drawings, wherein like reference numerals designate like structural elements.

DETAILED DESCRIPTION

Representative applications of apparatuses and methods according to the presently described embodiments are provided in this section. These examples are being provided solely to add context and aid in the understanding of the described embodiments. It will thus be apparent to one skilled in the art that the presently described embodiments can be practiced without some or all of these specific details. In other instances, well known process steps have not been described in detail in order to avoid unnecessarily obscuring the presently described embodiments. Other applications are possible, such that the following examples should not be taken as limiting.

Typically, users tend to use their devices to take pictures, download applications, music, videos, and/or other data. These types of data use up a lot of disk space on the user devices. Oftentimes, disk space on the user devices is limited and the user device constantly keeps running out of disk space. As previously noted herein, current systems display a list of applications running on the user device and ask the user to make an uninformed decision regarding which applications to keep or delete in order to free up disk space which is not a particularly good user experience.

Accordingly, the embodiments set forth herein provide various techniques for intelligently managing disk space while preserving the best user experience possible. The disk space is managed dynamically without requiring user intervention. According to one embodiment and to achieve the foregoing techniques, a disk space manager is configured to request various clients to free up certain amounts of disk space. The disk space manager is configured to identify which clients to request for disk space. The disk space manager is configured to determine how much disk space it needs to request from each of the clients.

According to one embodiment, the clients receive the requests from the disk space manager and respond by freeing up disk space. The clients can free up disk space by deleting a portion of their own data and/or by moving a portion of their data to an external cloud based service. Each client has its own policy that dictates whether or not the client can free up disk space and how much disk space it can free up.

According to one embodiment, the disk space manager is configured to communicate the requests to free up space at various urgency levels. Each level of urgency increases the demand from the client to free up space. For instance, at a first urgency level, the clients can free up some amount of disk space. If a required target amount of disk space is not achieved, the requests are communicated at a second urgency level. At the second urgency level, the clients can be more aggressive in deleting their data to free up disk space. If the required target amount of disk space is still not achieved, the requests are communicated at a third urgency level where the clients are requested to free up all disk space possible.

Accordingly, the foregoing approaches provide techniques for managing disk space in user devices. A more detailed discussion of these techniques is set forth below and described in conjunction with FIGS. 1-6, which illustrate detailed diagrams of systems and methods that can be used to implement these techniques.

Figure 1:
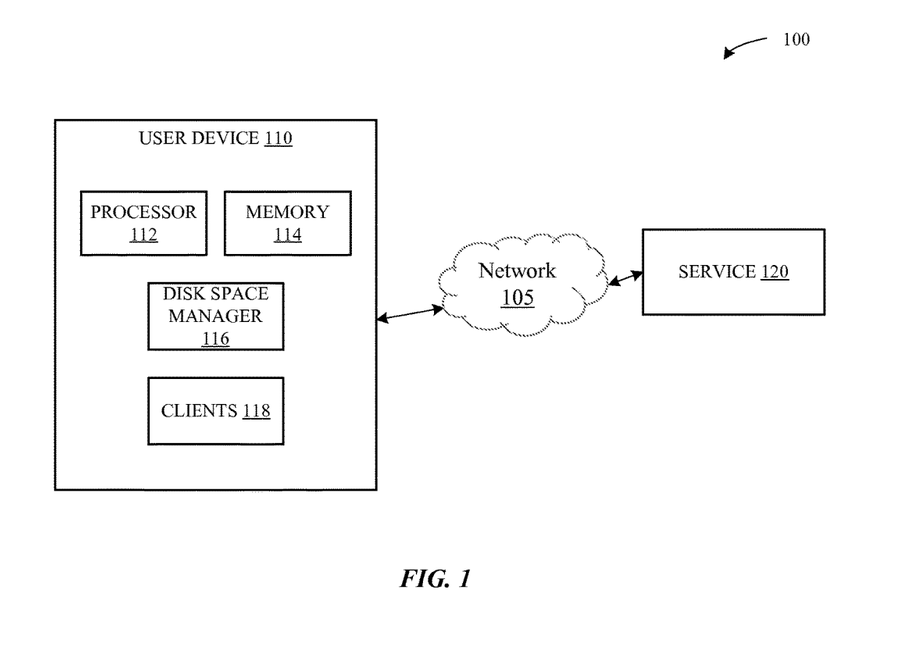
FIG. 1 illustrates a block diagram of different components of a system configured to implement the various techniques described herein, according to some embodiments.

FIG. 1 illustrates a block diagram of different components of a system 100 that is configured to implement the various techniques described herein, according to some embodiments. More specifically, FIG. 1 illustrates a high-level overview of the system 100, which, as shown, includes a user device 110 and a remote service 120 with which the user device 110 can communicate via a network 105. The user device 110 can represent a device having limited file storage capacity such as a mobile device (e.g., an iPhone®) or a tablet device (e.g. iPad®). Network 105 can include one or more of the Internet, an intranet, a PAN (Personal Area Network), a LAN (Local Area Network), a WAN (Wide Area Network), a MAN (Metropolitan Area Network), a wireless communication network, and other network or combination of networks.

According to the illustration of FIG. 1, the user device 110 can include a processor 112, a memory 114, a disk space manager 116, and a number of clients 118. The processor 112, in conjunction with the memory 114, is configured to execute the disk space manager 116, the clients 118, and/or other applications on the user device 110. The memory 114 can include a non-transitory computer readable storage medium configured to store instructions that, when executed by the processor 112 cause the disk space manager 116/ clients 118 to carry out the various techniques set forth herein.

Clients 118 can represent applications that are installed on the user device 110 and the user directly interacts with. According to one embodiment, clients 118 can include native or resident applications that are configured to run on a particular platform, such as clients developed for a mobile operating system (e.g., iOS or other operating system). According to one embodiment, one or more of the clients 118 can represent daemons that run as background processes rather than under the direct control of the user. Daemons may be triggered into activity in response to an occurrence of an event/condition (for example, at a specific time/date, at periodic time intervals, or other events/conditions).

Disk space manager 116 is configured to request one or more of the clients 118 to free up disk space associated with the user device 110 (e.g., disk space on a hard drive of the user device 110). According to one embodiment, the disk space manager 116 determines a total amount of disk space that needs to be freed. The disk space manager 116 then requests each of the one or more clients 118 to free up at least a portion of the total amount of disk space. The requests to free up disk space can be referred to as deletion requests. In other words, the disk space manager 116 is configured to communicate deletion requests to the one or more clients 118. The clients 118 can respond to the deletion requests by deleting at least a portion of their data to free up disk space and/or by moving a portion of their data to a cloud based service (for example, iCloud™ by Apple®). According to one embodiment, the service 120 can include the cloud based service.

According to one embodiment, the clients 118 and the disk space manager 116 implement a plugin based approach. Each client 118 can represent a plugin that can 1) receive deletion requests from the disk space manager 116, 2) respond to the deletion requests, and 3) report how much disk space it has freed up. Each client 118 can also report how much disk space it currently has available for deletion. This allows an interested party (e.g., iTunes) to discount that amount when displaying disk usage. The plugin based approach is exemplary and other approaches can be used without departing from the scope of this disclosure.

Figure 2:
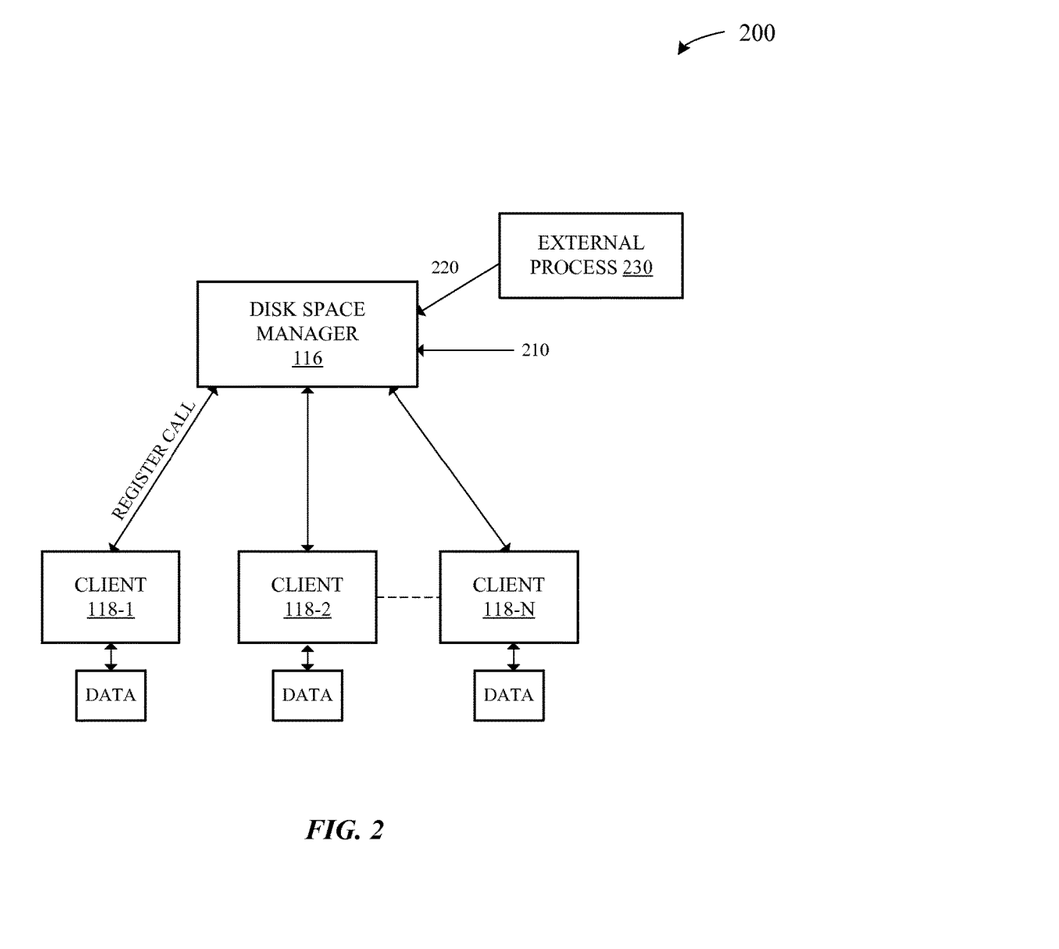
FIG. 2 illustrates a diagram of a more detailed view of particular components of the system of FIG. 1, according to some embodiments.

According to one embodiment, each client 118 (illustrated as client 118-1, client 118-2, . . . , client 118-N in FIG. 2) has its own data that uses up a certain amount of disk space on the hard drive. Thus, each client 118 has a first amount of disk space that is available and a second amount of disk space that is used. Each client 118 is configured to register with the disk space manager 116. By registering with the disk space manager 116, each client 118 agrees to participate in the protocol/procedure (as described below) used by the disk space manager 116 to free up disk space. According to one embodiment, each client 118 can register with the disk space manager 116 by including a static registration in a file system of the user device 110. The static registration provides information about the client 118 to the disk space manager 116. According to another embodiment, each client 118 can register with the disk space manager 116 dynamically when it is launched. For instance, when the client 118 is launched, the client 118 can make a register call to register with the disk space manager 116. The disk space manager 116 can maintain the registration information associated with the registered clients 118. The disk space manager 116 can cause the registration information to be stored in the file system. According to yet another embodiment, some of the clients 118 can be dynamically registered while others can be statically registered. Once registered, the clients 118 can receive the deletion requests from the disk space manager 116 and provide responses to the deletion requests.

According to one embodiment, the disk space manager 116 can receive a device request 210 to free up space. For example, when the user device 110 has run out of disk space or when free disk space in the user device 110 goes below a particular threshold limit, a low disk notification may be generated by the user device 110. The low disk notification may trigger a device request 210 for the disk space manager 116 to be generated. The device request 210 may be generated and provided to the disk space manager 116 by the user device 110. According to another embodiment, the disk space manager 116 can receive an external request 220 to free up disk space. In this case, the disk space manager 116 may receive the request from an external process 230. The external process 230 can include a process that would require a particular amount of disk space available (freed up) in order to proceed (for example, an OS update process, a software update process, a movie download process, etc.). For example, a movie download may trigger an external request 220 for the disk space manager 116. The external request 220 may be generated and provided to the disk space manager by the external process 230.

In response to the device request 210 or external request 220, disk space manager 116 determines a total target amount of disk space that needs to be freed up. The disk space manager 116 may make this determination based on the request 210/220. For example, if a movie download requires 7 GB of disk space and the user device 110 has only 1 GB of disk space available, the disk space manager 116 may make a determination that 6 GB of disk space needs to be freed. In other words, the total target amount of disk space that needs to be freed is 6 GB. The disk space manager 116 may query each client 118 for the amount of disk space that the client 118 has available or the amount of disk space the client 118 can make available by deleting at least a portion of its data (referred to hereinafter as "amount of available disk space").

Figure 3A:
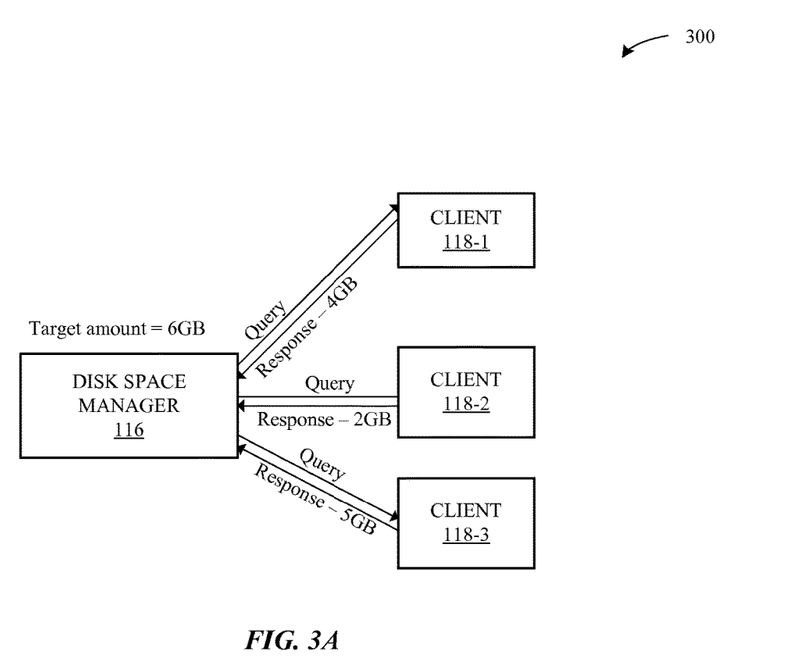
FIGS. 3A-3B illustrate conceptual diagrams that set forth an exemplary sequence for requesting the clients of FIG. 1 to free up disk space, according to some embodiments.

For instance, in a scenario where there are three clients (client 118-1, client 118-2, and client 118-3) registered with the disk space manager 116, the disk space manager 116 may query each of the three clients 118-1, 118-2, 118-3 for an amount of available disk space. As shown in FIG. 3A, the disk space manager 116 may receive a response from each client 118-1, 118-2, 118-3 regarding the amount of available disk space. For example, client 118-1 may respond to the query indicating that it has or can make 4 GB of disk space available, client 118-2 may respond to the query indicating that it has or can make 2 GB of disk space available, and client 118-3 may respond to the query indicating that it has or can make 5 GB of disk space available. As such, in response to the query, each client 118-1, 118-2, 118-3 can provide an estimate of the amount of available disk space.

Figure 3B:
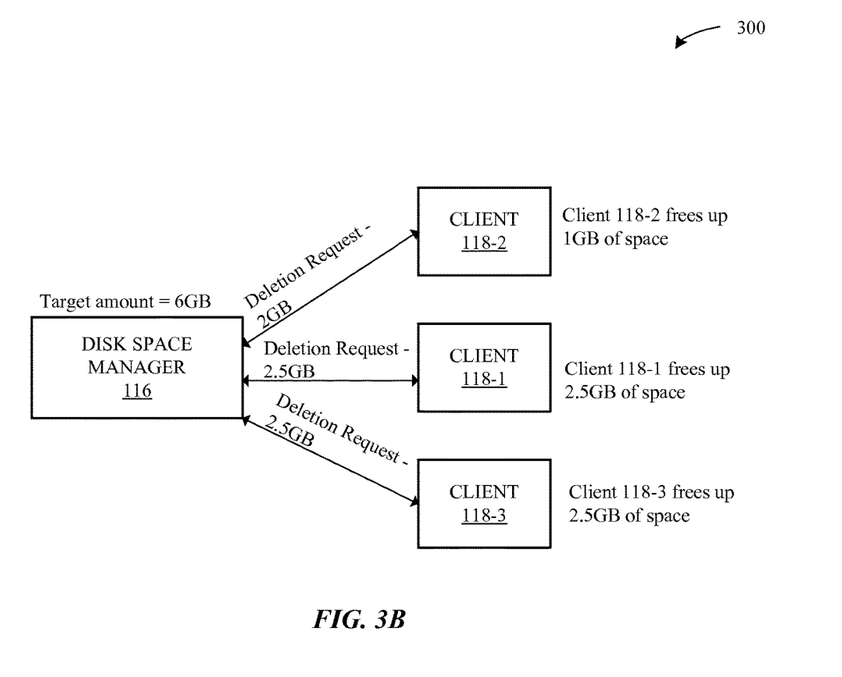

According to one embodiment, the disk space manager 116 can sort the clients 118 according to the amount of available disk space (such as, from least available disk space to most available disk space). As illustrated in FIG. 3B, disk space manager 116 then sends the deletion requests to the sorted clients, for example, client 118-2 with 2 GB, client 118-1 with 4 GB and client 118-3 with 5 GB. The disk space manager 116 sends the deletion requests in a round-robin fashion starting with the client 118-2 with least amount of available disk space and ending with the client 118-3 with most amount of available disk space, and then starting again with client 118-2, and so on.

According to one embodiment, the disk space manager 116 determines how much disk space to request from each client 118-2, 118-1, and 118-3 in order to achieve the total target amount of disk space. In other words, the disk space manager 116 determines how much disk space it can request each client to free up. Based on the responses to the queries, the disk space manager 116 is aware of the amount of available disk space for each client 118-2, 118-1, and 118-3. The disk space manager 116 makes the determination regarding how much disk space to request based on the amount available disk space for each client 118-2, 118-1, and 118-3.

According to one implementation, the disk space manager 116 determines what portion of the total target amount is to be requested from each client 118-2, 118-1, and 118-3. For example, the disk space manager 116 may distribute the total target amount 6 GB evenly among the clients 118-2, 118-1, and 118-3 (i.e., 2 GB for each client). The disk space manager 116 may send the deletion requests to the clients 118-2, 118-1, and 118-3 in a round-robin fashion. The disk space manager 116 may send a first deletion request to client 118-2 to free up 2 GB of disk space. In response to the first deletion request, the client 118-2 may either free up the requested amount of disk space or less than the requested amount of disk space. For example, as illustrated in FIG. 3B, the client 118-2 frees up 1 GB of disk space which is less than the requested amount. In this case, the client 118-2 frees up 1 GB of disk space even though it had previously indicated that the available amount of disk space is 2 GB (in response to the query from the disk space manager 116, for example). In other words, the client 118-2 initially estimated that it will be able to free up 2 GB of disk space but actually ended up freeing up only 1 GB. The client 118-2 notifies the disk space manager 116 of the amount of disk space it actually ended up freeing up (i.e., 1 GB).

The disk space manager 116 then determines that 5 GB of disk space is still needed and redistributes the 5 GB among clients 118-1 and 118-3. In this manner, if a particular client (for example, client 118-2) is not able to free up the requested amount of disk space, its shortage (for example, 1 GB) is redistributed among the other clients (for example, clients 118-1 and 118-3). As such, the 1 GB shortage is redistributed among clients 118-1 and 118-3 by requesting them to free up 2.5 GB instead of 2 GB. According to one embodiment, the disk space manager 116 may send a second deletion request to client 118-1 to free up 2.5 GB of disk space. In response to the second deletion request, the client 118-1 may either free up the requested amount of disk space or less than the requested amount of disk space. For example, as illustrated in FIG. 3B, the client 118-1 frees up 2.5 GB of disk space which is equal to the requested amount. The client 118-1 notifies the disk space manager 116 of the amount of disk space it actually ended up freeing up (i.e., 2.5 GB).

The disk space manager 116 then determines that 2.5 GB of disk space is still needed and sends a third deletion request to client 118-3 to free up 2.5 GB of disk space. In response to the third deletion request, the client 118-3 may either free up the requested amount of disk space or less than the requested amount of disk space. For example, as illustrated in FIG. 3B, the client 118-3 frees up 2.5 GB of disk space which is equal to the requested amount. The client 118-3 notifies the disk space manager 116 of the amount of disk space it actually ended up freeing up (i.e., 2.5 GB). In case the client 118-1 was able to free up only 1.5 GB instead of 2.5 GB, the client 118-3 would have been requested to free up the remaining 3.5 GB. According to one embodiment, if the clients 118-2, 118-2, and 118-3 were not able to free up the needed total target amount of disk space in the first iteration, the disk space manager 116 sends a second round of deletion requests to the 118-2, 118-2, and 118-3 in the next iteration albeit at a different (higher) urgency level than the first round of deletion requests. Also, while FIG. 3B depicts that a portion of the total target amount is requested from a number of client devices 118-2, 118-1, and 118-3, it will be appreciated that the total target amount may be requested from a single client device 118 if that client device has the total target amount available.

According to one embodiment, the deletion requests to free up disk space are distributed among clients 118-2, 118-1, and 118-3 in such a way that the same clients are not repeatedly asked to free up space. For instance, the user device 110 keeps track of which clients were recently requested by the disk space manager 116 to free up disk space. Thus, the recently requested clients would not be requested to free up disk space again. In one implementation, the disk space manager 116 may identify which clients 118 to request for disk space (i.e., to free up disk space) prior to sending out the deletion requests to the clients 118. For example, in the example of FIG. 3B, if client 118-2 was one of the recently requested clients, the disk space manager 116 may identify clients 118-1 and 118-3 as the clients to which the deletion requests are to be distributed. According to one embodiment, if all the clients are contributing then the majority of each client's cached data is not deleted and performance is improved.

According to one embodiment, the deletion requests to free up disk space are distributed among clients 118-2, 118-1, and 118-3 in such a way that the clients that have been recently run by the user are not asked to free up space. For instance, the user device 110 keeps track of which clients were recently run by the user. Thus, the recently run clients would not be requested to free up disk space. In other words, the clients that have not been run recently are requested to free up disk space. In one implementation, the user device 110 generates a list of clients that have been run recently (going from most recently run to least recently run). The inverse of the list is used to distribute the deletion requests. In one implementation, the disk space manager 116 may identify one or more of the least recently run clients as the clients to which the deletion requests are to be distributed.

According to one embodiment, the user device 110 can obtain a forecast of what clients will be expected to run in the near future. This allows the deletion requests to 1) be sent to clients that are not predicted to run in the near future, and 2) not be sent to clients that are predicted to run in the near future. The forecast can also be used for pre-emptive cleaning/compaction of data (for example, in cases where user device 110 is not currently out of disk space yet, but it is determined to be a good time to clean up the data). Typically, cleaning data is a CPU and power intensive process. According to one embodiment, the clean-up process can trigger the disk space manager 116 to communicate deletion requests to clients 118 to pre-emptively clean up data. These deletion requests can be communicated when the user device 110 is being charged by a wall charger (i.e., is on the mains) and/or the user is not using the user device 110, for example. In other words, the disk space manager 116 may be triggered to communicate these deletion requests when the user device is being charged and/or the user not currently using the user device 110.

According to one embodiment, each client 118-2, 118-1, and 118-3 responds to the deletion requests by freeing up some disk space. The clients 118-2, 118-1, and 118-3 can free up disk space by deleting at least a portion of their data and/or by moving a portion of their data to the cloud based service. Each client 118-2, 118-1, and 118-3 is configured to implement its own policy regarding the management of its data. The policy allows the client to determine the amount of available disk space, whether or not it can free up disk space, what data it can delete to free up disk space, and/or how much data it can delete. For example, a particular client may determine that it can delete database entries to free up disk space while another client may determine that it can delete files in addition to database entries. A particular client may determine that it can delete data that is mirrored/duplicated in the cloud based service to free up disk space. Another client may determine that it can delete data that can be easily regenerated or not delete data that is CPU and time intensive to regenerate (if deleted) or requires network access to regenerate. Thus, when the clients 118-2, 118-1, and 118-3 receive deletion requests from the disk space manager 116, each client determines a particular amount of disk space to free up based on its own policy and frees up the determined amount. As such, each client handles the deletion of its data based on its own policy. Since each client's policy may be different, each client may handle the deletion requests differently. The disk space manager 116 does not enforce any policies or handle deletion of the client data. The disk space manager 116 continues making deletion requests until the total target amount of disk space has been freed up by the clients 118-2, 118-1, and 118-3. According to the plugin based approach, the disk space manager is decoupled from the policy decisions of the clients 118-2, 118-1, and 118-3.

According to one embodiment, the deletion requests to free up disk space may be provided at various urgency levels. Each urgency level increases the demand from the client 118 to free up space. For example, when free space in the user device 110 goes below a particular threshold level, the deletion requests are sent to one or more clients 118 at a first urgency level. Each client 118 receives the deletion request and frees up some amount of disk space. If the total target amount of disk space is not achieved, a second round of deletion requests are sent to the clients 118 at a second urgency level. At the second urgency level, each client 118 is requested to delete an additional amount of disk space and the clients 118 are more aggressive in their deleting/freeing up of disk space. If the total target amount is still not achieved, a third round of deletion requests are sent at a third urgency level where the clients 118 are requested to free up all disk space possible.

According to one embodiment, each client's policy can dictate how much and what data will be deleted at each urgency level. Also, urgency levels may be defined differently for each client (in each client's policy). For example, a first urgency level may be different for one client than it is for another client. In an exemplary scenario, when a particular client represents a music application, at the first urgency level, the client may delete any songs that the user has not listened to for a particular period of time (for example, 1 year). At the second urgency level, the client may delete songs that the user has listened to but are not included in the user's playlist. At the third urgency level, the client may delete all songs. It will be appreciated that the number of urgency levels is exemplary and any number of urgency levels may be implemented to send deletion requests.

According to one embodiment, some clients 118 may delete data based on only one urgency level. These clients 118 can include a cache directory that includes files that can be deleted (for example, the developer has been told that the files can be deleted). The disk space manager 116 can send deletion requests to these clients to delete all the files in the cache directory. As such, disk space manager 116 does not implement various iterations at various urgency levels for these clients. In one implementation, these clients can include third-party clients.

According to one embodiment, the disk space manager 116 is configured to routinely (e.g., at periodic time intervals) send deletion requests to some clients 118 to delete privacy data. Privacy data can represent data that is to be maintained at the user device 110 temporarily (i.e., for a short period of time) and then expunged. Privacy data can include location history, password history, and/or other privacy data. The clients are polled at a particular frequency by the disk space manager 116 in order to delete to the privacy data.

In a scenario where the total target amount of disk space cannot be freed up despite the various iterations at various urgency levels, the user may be notified that the user device 110 is out of disk space. However, rather than simply providing the user with a listing of all the clients on the user device, the user may be provided with information regarding what clients and/or data can be deleted. This can allow the user to make an informed decision regarding which clients to keep or delete. For example, the user may be informed that a particular client takes 5 GB of disk space and that the user has not used this client for a particular period of time (for example, 3 years). The user may be provided with an option to delete the client. In some implementations, the user may be provided with an option to move some or all of the client's data to the cloud based service.

According to one embodiment, the disk space manager 116 can be temporarily turned off. For instance, in case an operation is to be performed on the user device 110 which will use up large amounts of disk space temporarily, the user may not want the disk space manager 116 to be triggered while the operation is being performed.

While various embodiments have been described for user devices having limited file storage capacity because disk space is generally more restricted on such devices and these devices are more constrained in terms of CPU and battery power resources, it will be appreciated that the embodiments described herein can be used for other types of devices, for example desktop computers, laptop computers, or other computing devices.

Also, while various embodiments have been described for clients that include native applications, it will be appreciated that the embodiments described herein can be used for third-party applications or clients developed for a desktop operating system (e.g., Mac OS X, or other desktop operating system) or other type of operating system.

Figure 4:
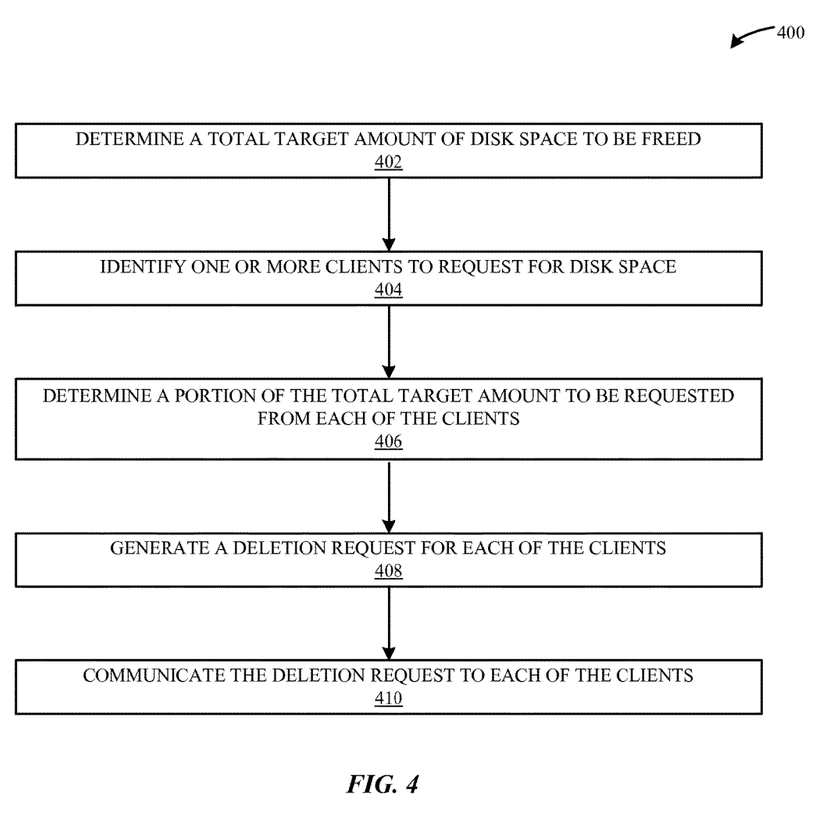
FIG. 4 illustrates a method that is carried out by a disk space manager of the user device of FIG. 1, according to one embodiment.

FIG. 4 illustrates a method 400 that is carried out by the disk space manager of FIG. 1, according to one embodiment. As shown, the method 400 begins at step 402, where the disk space manager 116 determines a total target amount of disk space that needs to be freed. The disk space manager may determine the total target amount of disk space based on the device request 210 or the external request 220.

At step 404, the disk space manager 116 identifies one or more clients 118 to request for disk space (i.e., to free up disk space). For example, the disk space manager 116 may identify one or more clients 118 that have not been recently requested to delete disk space. In one implementation, the disk space manager 116 may identify which clients 118 to request for disk space prior to sending out deletion requests to the clients 118.

At step 406, the disk space manager 116 determines a portion of the total target amount that is to be requested from each of the clients 118. For example, as shown in FIG. 3B, the disk space manager 116 determines that client 118-2 is to be requested 2 GB, client 118-1 is to be requested 2.5 GB, and client 118-3 is to be requested 2.5 GB.

At step 408, the disk space manager 116 generates a deletion request for each of the clients 118. The deletion request can include a request to free up the portion of the total target amount of disk space. At step 410, the disk space manager communicates the deletion request to each of the clients 118. The disk space manager 116 can continue to communicate deletion requests at various urgency levels until the needed total target amount of disk space is freed up.

Figure 5:
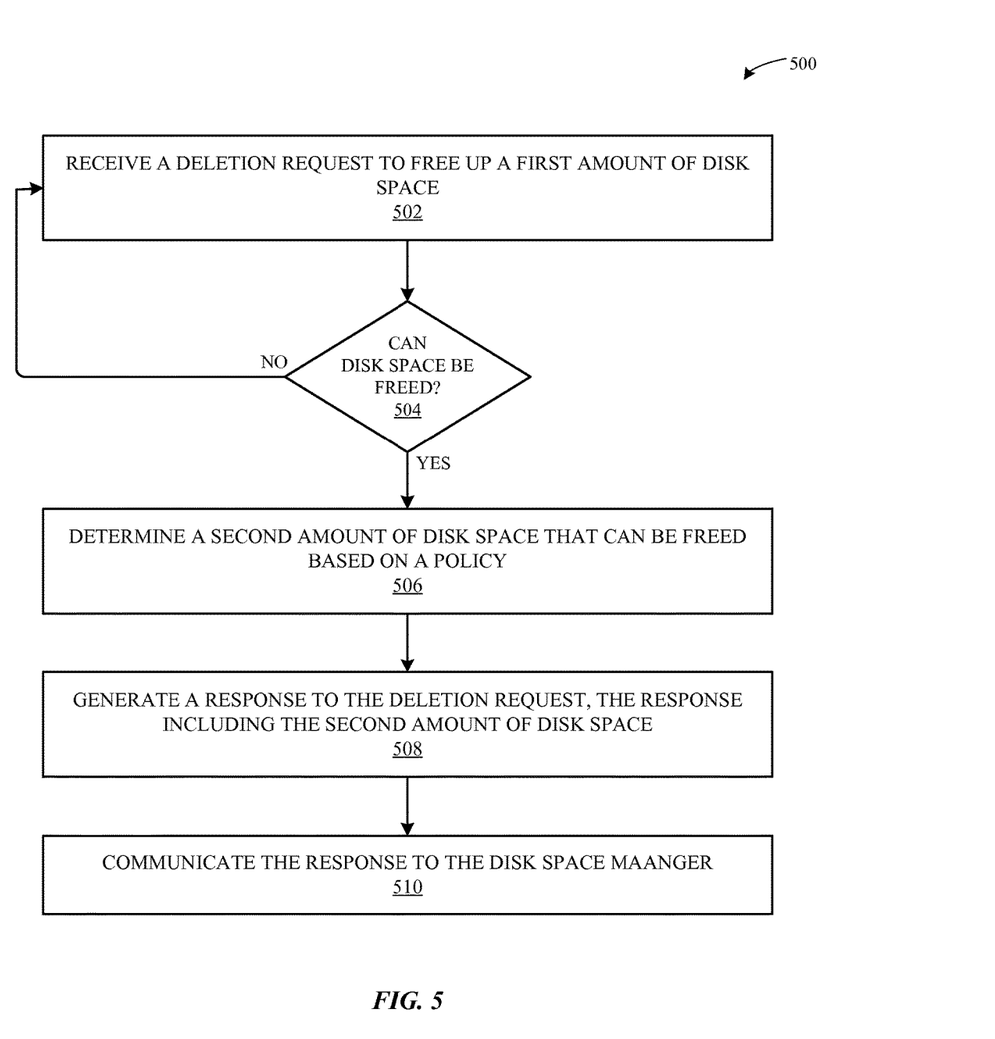
FIG. 5 illustrates a method that is carried out by a client of the user device of FIG. 1 according to one embodiment.

FIG. 5 illustrates a method carried out by a client 118, according to one embodiment. At step 502, the client 118 receives a deletion request from the disk space manager 116. The deletion request can include a request to free up a first amount of disk space. The first amount of disk space can include a portion of the total target amount of disk space.

At step 504, the client 118 determines whether it can delete the requested disk space based on its policy. In response to a determination that disk space can be freed, the client determines a second amount of disk space that can be freed based on its policy, at step 506. The client 118 can free up the second amount of disk space by deleting a portion of the client's data and/or moving a portion of the client's data to the cloud based service. The policy dictates how the client 118 determines 1) the amount of available disk space, 2) whether or not it can free up disk space, 3) what data it can delete to free up disk space, and/or 4) how much data it can delete. According to one embodiment, the client 118 can determine that it can free up the requested first amount of disk space. In this case, the second amount is equal to the first amount. According to another embodiment, the client can determine that it can free up less that the requested first amount of disk space. In this case, the second amount is less than the first amount. In response to a determination that disk space cannot be freed, the client 118 continues to receive deletion requests from the disk space manager at step 502.

At step 508, the client 118 generates a response to the deletion request. The response includes the second amount of disk space. At step 510, the client 118 communicates the response to the disk space manager 116. In other words, the client 118 reports the second amount of disk space that it has actually freed up to the disk space manager 116.

Figure 6:
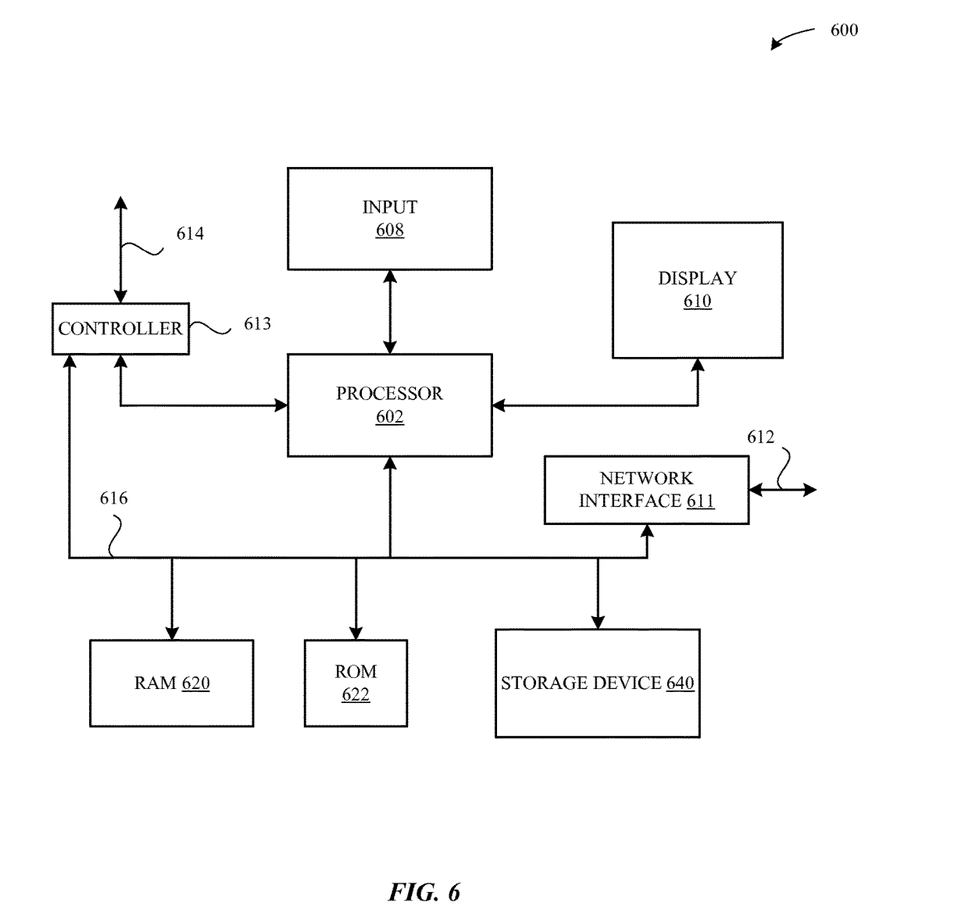
FIG. 6 illustrates a detailed view of a computing device that can be used to implement the various components described herein, according to some embodiments.

FIG. 6 illustrates a detailed view of a computing device 600 that can be used to implement the various components described herein, according to some embodiments. In particular, the detailed view illustrates various components that can be included in the user device 110 illustrated in FIG. 1. As shown in FIG. 6, the computing device 600 can include a processor 602 that represents a microprocessor or controller for controlling the overall operation of computing device 600. The computing device 600 can also include a user input device 608 that allows a user of the computing device 600 to interact with the computing device 600. For example, the user input device 608 can take a variety of forms, such as a button, keypad, dial, touch screen, audio input interface, visual/image capture input interface, input in the form of sensor data, etc. Still further, the computing device 600 can include a display 610 (screen display) that can be controlled by the processor 602 to display information to the user (for example, email interface described herein). A data bus 616 can facilitate data transfer between at least a storage device 640, the processor 602, and a controller 613. The controller 613 can be used to interface with and control different equipment through and equipment control bus 614. The computing device 600 can also include a network/bus interface 611 that couples to a data link 612. In the case of a wireless connection, the network/bus interface 611 can include a wireless transceiver.

The computing device 600 also include a storage device 640, which can comprise a single disk or a plurality of disks (e.g., hard drives), and includes a storage management module that manages one or more partitions within the storage device 640. In some embodiments, storage device 640 can include flash memory, semiconductor (solid state) memory or the like. The computing device 600 can also include a Random Access Memory (RAM) 620 and a Read-Only Memory (ROM) 622. The ROM 622 can store programs, utilities or processes to be executed in a non-volatile manner. The RAM 620 can provide volatile data storage, and stores instructions related to the operation of the computing device 600.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable medium. The computer readable medium is any data storage device that can store data which can thereafter be read by a computer system. Examples of the computer readable medium include read-only memory, random-access memory, CD-ROMs, DVDs, magnetic tape, hard disk drives, solid state drives, and optical data storage devices. The computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A method for managing disk space in a user device, the method comprising, at the user device:
   identifying a target amount of disk space to be freed;
   identifying, based on at least one criterion, one or more clients that are to be requested to free disk space;
   identifying, for each client of the one or more clients, a respective portion of the target amount that is to be requested to be freed by the client;
   sending, to each client of the one or more clients, a respective first deletion request to free the respective portion of the target amount;
   in response to determining that the first deletion requests do not cause the target amount of disk space to be freed:
      sending, to each client of the one or more clients, a respective second deletion request associated with a respective urgency level that causes the client to delete at least a subset of data that was not deleted in response to the respective first deletion request.

2. The method of claim 1, wherein the at least one criterion comprises the one or more clients that have not been recently requested to free disk space.

3. The method of claim 1, wherein the at least one criterion comprises the one or more clients that have not been recently executed on the user device.

4. The method of claim 1, wherein the at least one criterion comprises the one or more clients that are not predicted to run in a near future.

5. The method of claim 1, wherein the respective urgency level for a second deletion request corresponds to cached data managed by the client to which the second deletion request is sent.

6. The method of claim 1, wherein the respective urgency level for a second deletion request corresponds to privacy data managed by the client to which the second deletion request is sent.

7. The method of claim 1, wherein the respective urgency level for a second deletion request corresponds to data that has not been accessed within a threshold amount of time by the client to which the second deletion request is sent.

8. The method of claim 1, further comprising:
   receiving, in response to each second deletion request, a respective response that indicates a respective amount of disk space freed by the client to which the second deletion request is sent.

9. The method of claim 1, wherein the one or more clients comprise native operating system (OS) applications and/or user applications.

10. A user device configured to manage disk space, the user device comprising:
    at least one processor; and
    at least one storage medium configured to store instructions that, when executed by the at least one processor, cause the user device to:
    identify a target amount of disk space to be freed;
    identify, based on at least one criterion, one or more clients that are to be requested to free disk space;
    identify, for each client of the one or more clients, a respective portion of the target amount that is to be requested to be freed by the client;
    send, to each client of the one or more clients, a respective first deletion request to free the respective portion of the target amount;
    in response to determining that the first deletion requests do not cause the target amount of disk space to be freed:
       send, to each client of the one or more clients, a respective second deletion request associated with a respective urgency level that causes the client to delete at least a subset of data that was not deleted in response to the respective first deletion request.

11. The user device of claim 10, wherein the at least one criterion comprises the one or more clients that have not been recently requested to free disk space.

12. The user device of claim 10, wherein the at least one criterion comprises the one or more clients that have not been recently executed on the user device.

13. The user device of claim 10, wherein the at least one criterion comprises the one or more clients that are not predicted to run in a near future.

14. The user device of claim 10, wherein the respective urgency level for a second deletion request corresponds to cached data managed by the client of to which the second deletion request is sent.

15. The user device of claim 10, wherein the respective urgency level for a second deletion request corresponds to privacy data managed by the client to which the second deletion request is sent.

16. The user device of claim 10, wherein the respective urgency level for a second deletion request corresponds to data that has not been accessed within a threshold amount of time by the client to which the second deletion request is sent.

17. The user device of claim 10, wherein the at least one processor further causes the user device to:
receive, in response to each second deletion request, a respective response that indicates a respective amount of disk space freed by the client to which the second deletion request is sent.

18. The user device of claim 10, wherein the one or more clients comprise native operating system (OS) applications and/or user applications.

19. At least one non-transitory computer readable storage medium configured to store instructions that, when executed by at least one processor included in a user device, cause the user device to manage disk space, by carrying out steps that include:
identifying a target amount of disk space to be freed;
identifying, based on at least one criterion, one or more clients that are to be requested to free disk space;
identifying, for each client of the one or more clients, a respective portion of the target amount that is to be requested to be freed by the client;
sending, to each client of the one or more clients, a respective first deletion request to free the respective portion of the target amount;
in response to determining that the first deletion requests do not cause the target amount of disk space to be freed:
sending, to each client of the one or more clients, a respective second deletion request associated with a respective urgency level that causes the client to delete at least a subset of data that was not deleted in response to the respective first deletion request.

20. The at least one non-transitory computer readable storage medium of claim 19, wherein the one or more clients comprise native operating system (OS) applications and/or user applications.

\* \* \* \* \*